United States Patent
Yu et al.

(10) Patent No.: US 11,561,871 B2
(45) Date of Patent: Jan. 24, 2023

(54) DATA TRANSMISSION AND PROTECTION SYSTEM AND METHOD THEREOF

(71) Applicant: GRAID Technology Inc., Los Angeles, CA (US)

(72) Inventors: Tsung-Lin Yu, Luodong (TW); Cheng-Yue Chang, New Taipei (TW); Guo-Fu Tseng, New Taipei (TW)

(73) Assignee: GRAID Technology Inc., Santa Clara, CA (US)

( * ) Notice: Subject to any disclaimer, the term of this patent is extended or adjusted under 35 U.S.C. 154(b) by 130 days.

(21) Appl. No.: 16/989,445

(22) Filed: Aug. 10, 2020

(65) Prior Publication Data
US 2021/0191642 A1 Jun. 24, 2021

Related U.S. Application Data (60) Provisional application No. 62/949,999, filed on Dec. 18, 2019.

(51) Int. Cl.
| | |
|---|---|
| *G06F 11/00* | (2006.01) |
| *G06F 11/20* | (2006.01) |
| *G06F 3/06* | (2006.01) |
| *G06T 1/20* | (2006.01) |
| *G06F 13/28* | (2006.01) |

(52) U.S. Cl.
CPC ........ *G06F 11/2094* (2013.01); *G06F 3/0619* (2013.01); *G06F 3/0647* (2013.01); *G06F 3/0688* (2013.01); *G06F 13/28* (2013.01); *G06T 1/20* (2013.01)

(58) Field of Classification Search
None
See application file for complete search history.

(56) References Cited

U.S. PATENT DOCUMENTS

| | | | |
|---|---|---|---|
| 2013/0042053 A1* | 2/2013 | Huang | G06F 3/0638 711/E12.008 |
| 2017/0177222 A1* | 6/2017 | Singh | G06F 13/4265 |
| 2019/0384532 A1* | 12/2019 | Ananthapalli | G06F 3/0659 |
| 2020/0125447 A1* | 4/2020 | Hosmani | G06F 3/0619 |
| 2020/0326855 A1* | 10/2020 | Wu | G06F 3/0659 |

FOREIGN PATENT DOCUMENTS

WO  WO-2019127212 A1 *  7/2019 ........... G06F 3/0619

OTHER PUBLICATIONS

Google Scholar/Patents search—text refined (Year: 2022).*

* cited by examiner

*Primary Examiner* — Christopher S Mccarthy
(74) *Attorney, Agent, or Firm* — Van Pelt, Yi & James LLP (57) ABSTRACT

A data transmission and protection system includes a plurality of solid-state drives (SSDs), a storage medium, a central processing unit (CPU) and a massively parallel processor (MPP). The storage medium storing an application program and a redundant array of independent disks (RAID) configuration. The CPU is coupled to the storage medium and configured to execute the application program to generate a virtual SSD interface for the plurality of SSDs according to the RAID configuration. The MPP is coupled to the virtual SSD interface and the plurality of SSDs. The MPP is configured to execute data exchange with the plurality of SSDs in response to a command received from the virtual SSD interface.

20 Claims, 8 Drawing Sheets

DATA TRANSMISSION AND PROTECTION SYSTEM AND METHOD THEREOF

BACKGROUND OF THE INVENTION

1. Field of the Invention

The present invention relates to a data transmission and protection system, more especially, to a high-speed data transmission and protection system achieved by leveraging the massively parallel processor (MPP), such as a GPU.

2. Description of the Prior Art

In this efficiency-oriented and highly developed society, the speed of data transmission has been receiving more and more attention. Especially in the companies that need to transmit large amounts of data, the high-speed transmission of data is an indispensable factor. In general, the company uses a storage server with a plurality of hard disks to manage and store the important data. The storage server employs a redundant array of independent disks (RAID) system implemented by software or a dedicated hardware RAID card to protect the data from damage. The RAID system combines the hard disks in the server into one or multiple virtual block devices, so that the operating system (OS) only needs to store the data into the virtual block devices, and the data can be automatically mirrored or erasure-coded and placed in the corresponding hard disks by the RAID system. By doing so, the RAID system not only aggregates the performance of individual hard disks but also prevents data loss in the event of hard disk failure.

In recent years, the technology of the storage medium has made a giant leap. Hard disks are being replaced by solid-state drives (SSDs) gradually as SSDs are becoming more affordable with large capacity and much better performance. The input/output operations per second (IOPS) of the novel SSDs can achieve 400,000~600,000, while that of the traditional hard disks is only around 110~150.

Although the IOPS of the SSDs has improved significantly, the traditional hardware RAID card can only achieve about 100,000 IOPS when processing and transmitting the data to and from SSDs. That is to say, the processing power of the hardware RAID card does not match the performance of the SSD, thereby limiting the overall storage performance. On the other hand, software-implemented RAID can achieve higher IOPS than the hardware RAID card. However, software RAID consumes a significant amount of CPU resources, crowding out other applications running on the same server, thereby decreasing the service performance.

Therefore, it is necessary to develop a new data transmission and protection system that can exchange data with high speed while providing data protection to solve the problems of the prior art.

SUMMARY OF THE INVENTION

Therefore, one category of the present invention is to provide a data transmission and protection system. The data transmission and protection system includes a plurality of solid-state drives (SSDs), a storage medium, a central processing unit (CPU) and a massively parallel processor (MPP). The storage medium stores an application program and a redundant array of independent disks (RAID) configuration. The CPU is coupled to the storage medium and configured to execute the application program to set up the MPP and to generate a virtual SSD interface for the SSDs according to the RAID configuration. The MPP is coupled to the virtual SSD interface and the SSDs. The MPP is configured to receive and process a command from the virtual SSD interface and configured to process and exchange the data with the SSDs directly.

Wherein, the MPP is a graphics processing unit (CPU).

Wherein, the SSDs are non-volatile memory express (NVMe) SSDs.

Wherein, the MPP is configured to receive a data writing command from the virtual SSD interface. The MPP generates a redundant data corresponding to a data to be written by the writing command based on the RAID configuration.

Furthermore, the MPP determines the places to store the data to be written by the writing command and the redundant data generated based on the RAID configuration, and then the MPP controls the SSDs by peer-to-peer direct memory access (DMA) directly to write the data to be written and the redundant data from a memory into the SSDs.

Wherein, the MPP is configured to receive a data reading command from the virtual SSD interface. The MPP determines the places of the data pieces to be read based on the RAID configuration, and then the MPP controls the SSDs by peer-to-peer DMA directly to read the data to be read and the redundant data in the SSDs into the memory.

Furthermore, the MPP combines the data pieces to be read from the plurality of the SSDs and returns the combined data to the virtual SSD interface in response to the data reading command accordingly.

Furthermore, the MPP calculates the original data from the data pieces read from corresponding SSDs when the RAID configuration is in a degraded mode, and returns the combined data to the virtual SSD interface in response to the data reading command accordingly.

Wherein, the MPP is configured to execute a scrubbing process to check for the data integrity in the SSDs and recover the data when the inconsistency is found at a regular time interval.

Wherein, the MPP is configured to recover the data on a failed SSD to a newly replaced SSD based on the RAID configuration and the redundant data in the SSDs.

Wherein, the SSDs can be located on the same server that the MPP installed or on the remote server with or without the MPP installed. The SSDs on the remote servers in the aspect of the MPP are coupled to the local MPP via NVMe over Fabrics (NVMeoF) protocol.

Wherein, the virtual SSD interface of the SSDs can be located on a single server or multiple servers.

Another category of the present invention is to provide a data transmission and protection method. The method includes the steps of following: the CPU executes the application program stored on the storage medium to generate a virtual SSD interface and set up the MPP according to the RAID configuration; the MPP receives the command from the virtual SSD interface; the MPP handles the data exchange with the SSDs according to the command; and the MPP replies the command completion to the virtual SSD interface.

In one embodiment, the step of the MPP receives the command from the virtual SSD interface further includes the step of following: the MPP receives a data writing command.

Furthermore, the step of the MPP handles the data exchange with the SSDs according to the command further includes the steps of following: the MPP determines the places to write the data to be written and a redundant data in the SSDs; the MPP generates the redundant data corresponding to the data to be written based on the RAID configuration; and the MPP controls the SDDs by peer-to-peer DMA directly to write the data to be written and the redundant data from a memory into the SSDs.

In one embodiment, the step of the MPP receives the command from the virtual SSD interface further includes the step of following: the MPP receives a data reading command.

Furthermore, the step of the MPP handles the data exchange with the SSDs according to the command further includes the steps of following: the MPP determines the places to read the data pieces of the data to be read and the redundant data in the SSDs; the MPP controls the SSDs by peer-to-peer DMA directly to read the data pieces of the data to be read and the redundant data in the SSDs into the memory; the MPP combines the data pieces from the SSDs based on the RAID configuration in a normal RAID state; and the MPP recovers the data pieces from the SSDs based on the RAID configuration in a degraded RAID state.

In one embodiment, the method of the present invention further includes the step of following: the MPP executes a scrubbing process to check for the data integrity in the SSDs and repairs the data at a regular time interval.

In one embodiment, the method of the present invention further includes the steps of following: the MPP determines whether any SSD have failed and replaced; if it does, the MPP recovers the data on the failed SSD to a newly replaced SSD based on the RAID configuration and the corresponding redundant data stored in the SSDs.

In one embodiment, the step of CPU executes the application program stored on the storage medium to generate the virtual SSD interface and set up the MPP according to the RAID configuration further includes the steps of following: the MPP couples SSDs on the same PCIe bus directly via peer-to-peer DMA; the MPP couples SSDs on a remote server via NVMeoF; and the CPU generates the virtual SSD interface for any SSDs that connected via peer-to-peer DMA or NVMeoF.

In summary, the data transmission and protection system of the present invention leverages the MPP to process the I/O commands received from the virtual SSD interface and to exchange the data with the SSDs. Moreover, the MPP can control the SSDs by peer-to-peer DMA directly instead of the CPU. By nature, the MPP is able to process the I/O commands parallelly and efficiently. Furthermore, the MPP can execute the data protecting processes to check the data integrity and execute the data recovery processes to recover the error data or broken SSD. Hence, the present invention can achieve extremely high performance without consuming the CPU resources, saving the precious computing resource for other applications running on the server.

DETAILED DESCRIPTION OF THE INVENTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of embodiments of the present invention.

Figure 1:
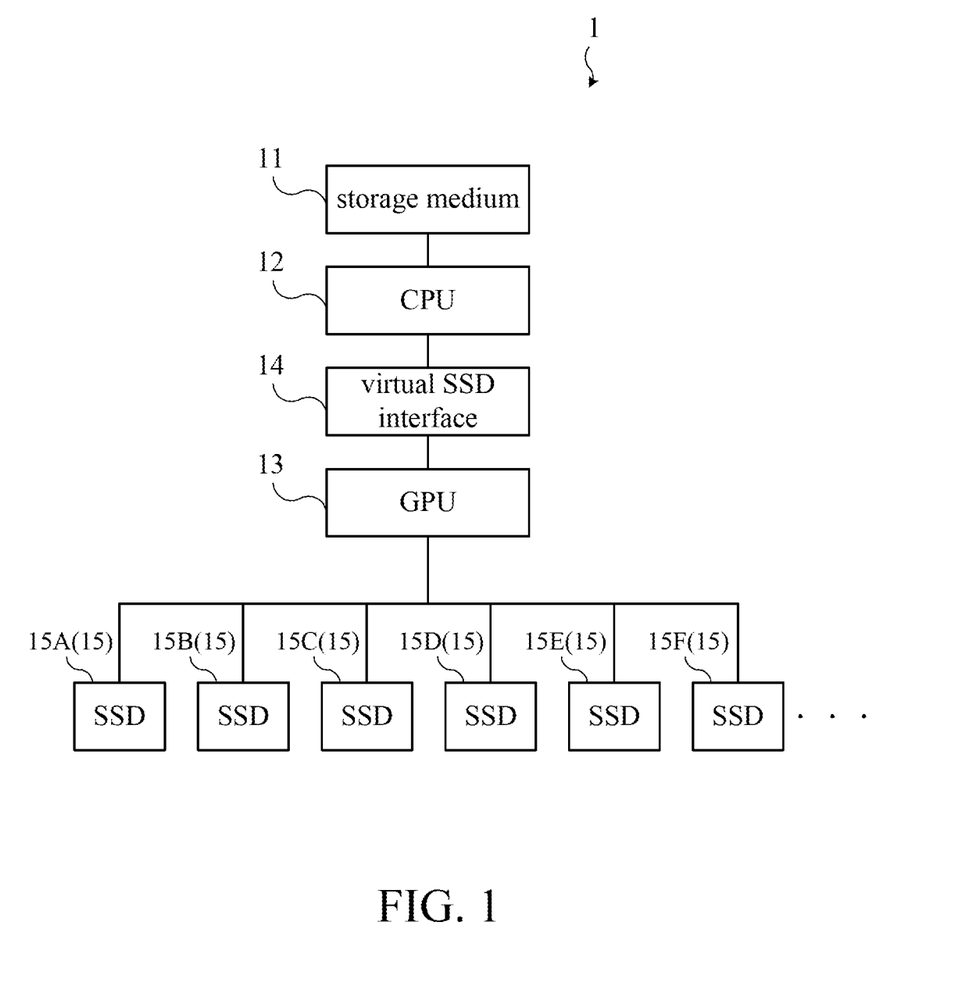
FIG. 1 is a functional block schematic diagram illustrating a data transmission and protection system in an embodiment of the present invention.

Please refer to FIG. 1. FIG. 1 is a functional block schematic diagram illustrating a data transmission and protection system 1 in an embodiment of the present invention. In this embodiment, the data transmission and protection system 1 includes a storage medium 11, a CPU 12, a massively parallel processor (MPP) 13 and a plurality of solid-state drives (SSDs) 15. The storage medium 11 stores an application program and a redundant array of independent disks (RAID) configuration. The CPU 12 is coupled to the storage medium and configured to execute the application program to set up the MPP 13 and to generate a virtual SSD interface 14 for the SSDs 15 according to the RAID configuration. The MPP 13 is coupled to the virtual SSD interfaces 14 and configured to receive and process commands from the virtual SSD interface 14. The MPP 13 is also coupled to the plurality of SSDs 15 and configured to process and exchange the data with the SSDs 15 directly. It is noticed that the number of the SSDs 15 in FIG. 1 is not limited to six, it can be two, three, four five or more than six.

In practice, the storage medium 11, the CPU 12, the MPP 13, the virtual SSD interface 14 and the SSDs 15 can be integrated in a computer or server, but not limited thereto. The storage medium 11 can be a hard disk, a flash memory card, a flash disk and so on. The MPP 13 can be a GPU, massively parallel programmable processor (MPPP), or any unit with parallel computing function. The virtual SSD interface 14 can be a Linux block device or a Windows drive of the computer. The RAID configuration includes a plurality of RAID level, such as RAID 1, RAID 5, RAID 6 and so on. Moreover, the CPU 12 can also execute the application program to generate two or more than two virtual SSD interfaces which have its own RAID levels.

Figure 2:
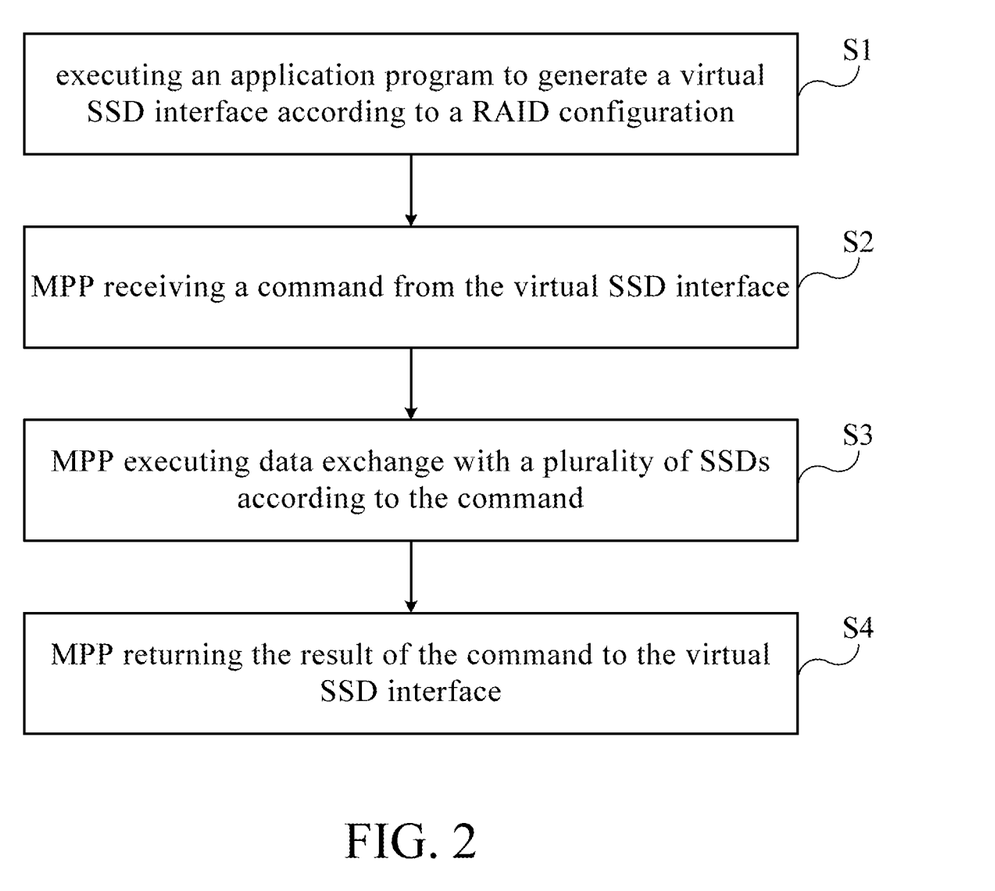
FIG. 2 is a flow diagram illustrating a data transmission and protection method in an embodiment of the present invention.

Please refer to FIG. 1 and FIG. 2. FIG. 2 is a flow diagram illustrating a data transmission and protection method in an embodiment of the present invention. The method can be achieved by the data transmission and protection system 1 in FIG. 1. In this embodiment, the data transmission and protection method includes the steps of following: step S1, the CPU 12 executes the application program stored on the storage medium 11 to generate a virtual SSD interface 14 and set up the MPP 13 according to the RAID configuration; step S2, the MPP 13 receives the command from the virtual SSD interface 14; step S3, the MPP 13 executes the data exchange with the SSDs 15 according to the command; and step S4, the MPP 13 returns the result of the command to the virtual SSD interface 14.

In practice, step S1 can be started automatically by a startup script during the system boot up. The application program generates one virtual SSD interface for each logical drive of the RAID configuration. The logical drive of the RAID configuration includes a subset of the plurality of SSDs 15. Thus, the RAID configuration may contain one or multiple logical drives. For example, a first virtual SSD interface is generated based on RAID 1, and the SSD 15A and the SSD 1513 of the plurality of SSDs 15 are configured for the first virtual SSD interface; a second virtual SSD interface is generated based on RAID 5, and the SSD 15C, SSD 15D, SSD 15E and SSD 15F of the plurality of SSDs 15 are configured for the second virtual SSD interface. Then, the application program launches an MPP program to run on the MPP 13. To illustrate, the MPP program can be a CUDA kernel running on an Nvidia GPU for instance.

In step S2 and S3, the MPP 13 receives the command from the virtual SSD interface 14 and executes the data exchange with the SSDs 15. In practice, the command can be an I/O command, such as writing, trimming, discarding command etc. The MPP 13 processes the commands and executes the data exchange with the SSDs 15 based on the configured RAID level and the offset and length of the I/O command. The MPP 13 generates a result of the command after exchanging the data with the SSDs 15. Then, the result of the command will be returned by the MPP 13 to the virtual SSD interface 14 in step S4.

Figure 3:
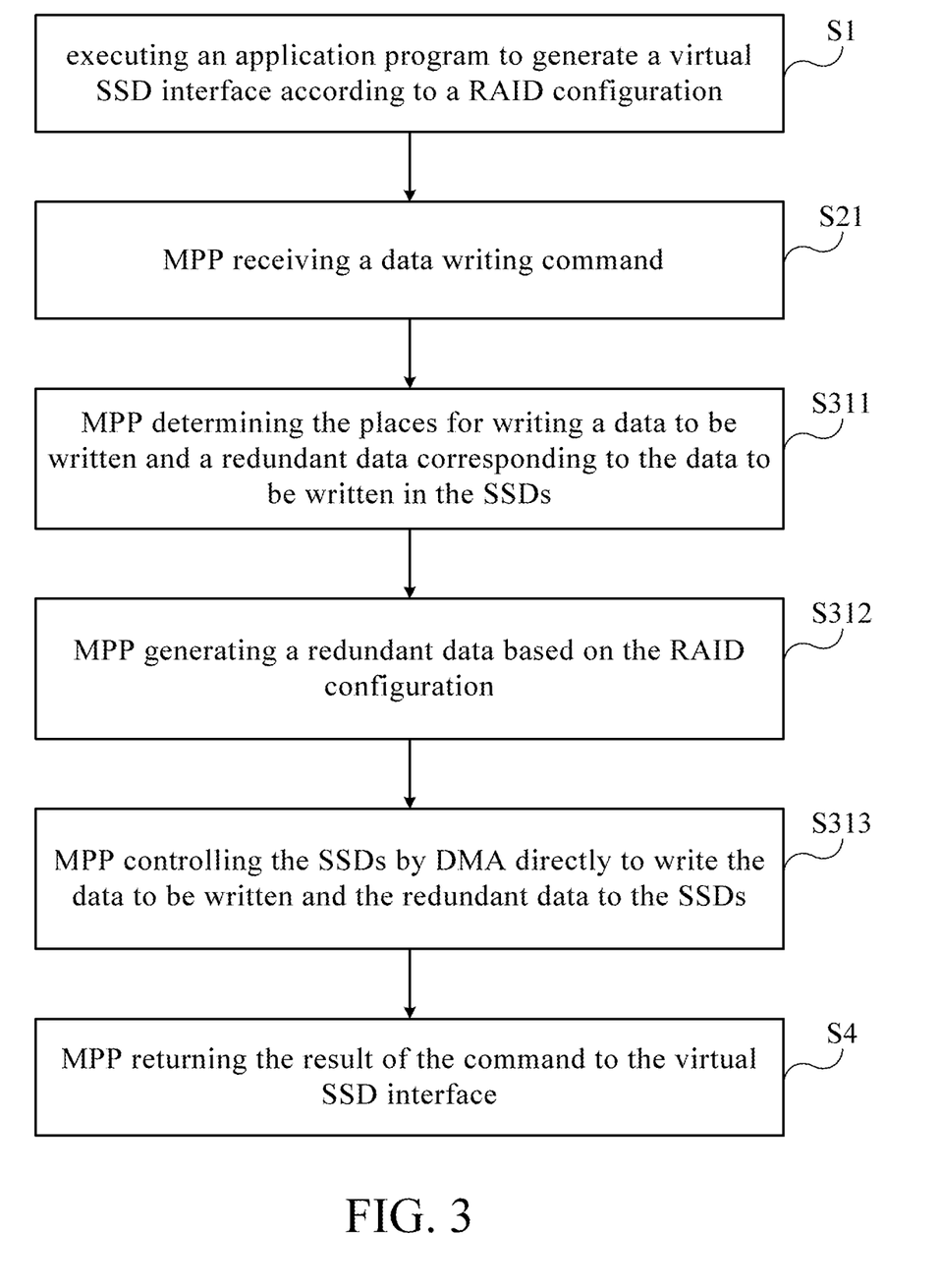
FIG. 3 is a flow diagram illustrating the data transmission and protection method in another embodiment of the present invention.

Please refer to FIG. 1 and FIG. 3. FIG. 3 is a flow diagram illustrating the data transmission and protection method in another embodiment of the present invention. The method can be achieved by the data transmission and protection system 1 in FIG. 1. In steps of S21, S311 and S312, when the MPP 13 receives the data writing command from the virtual SSD interface 14, the MPP 13 generates the necessary redundant data corresponding to the data to be written according to the configured RAID level. Depending on the RAID level and the offset and length of the data writing command, the MPP 13 divides the data to be written into data pieces and determines the locations of the data pieces in SSDs 15, and then the MPP 13 controls the SSDs by peer-to-peer direct memory access (DMA) directly (in step S313) to write data pieces into the SSDs. It should be noted that the MPP 13 can be coupled with the SSDs 15 by a high-speed bus with peer-to-peer transmission capability, such as the PCIe bus. In one embodiment, the SSDs 15 are the NVMe SSDs. Finally, the MPP 13 returns the writing result to the virtual SSD interface 14 to complete the I/O command in step S4. Therefore, the data exchange between the MPP 13 and the SSDs 15 does not need to go through the CPU 12, so it does not consume any CPU resources at all, thereby increasing the transmission efficiency.

Figure 4:
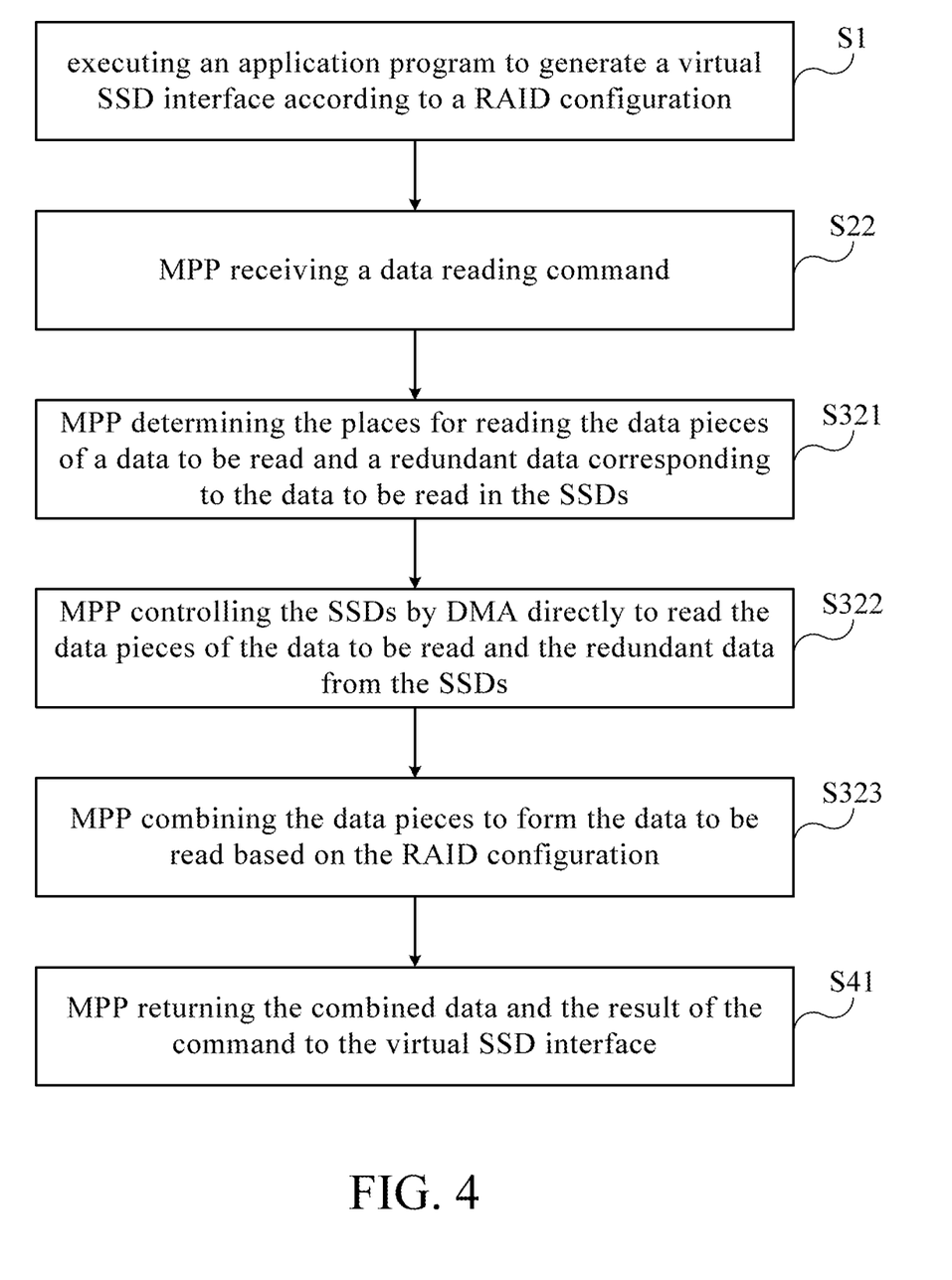
FIG. 4 is a flow diagram illustrating the data transmission and protection method in another embodiment of the present invention.

Please refer to FIG. 1 and FIG. 4. FIG. 4 is a flow diagram illustrating the data transmission and protection method in another embodiment of the present invention. The method can be achieved by the data transmission and protection system 1 in FIG. 1. In steps of S22, S321 and step S322, when the MPP 13 receives a data reading command from the virtual SSD interface 14, the MPP 13 determines the number of the data pieces of the data to be read and determines the locations of the data pieces in SSDs 15, and then the MPP 13 controls the SSDs by peer-to-peer DMA directly to read the data pieces from the SSDs. Then, the MPP 13 combines the data pieces when the RAID configuration is in a normal RAID state (in step S323). In one embodiment, when the RAID configuration is in a degraded RAID state, the MPP 13 recovers the data by the redundant data. After the data is ready, the MPP 13 returns the IO completion to virtual SSD interface 14 in S41.

Figure 5:
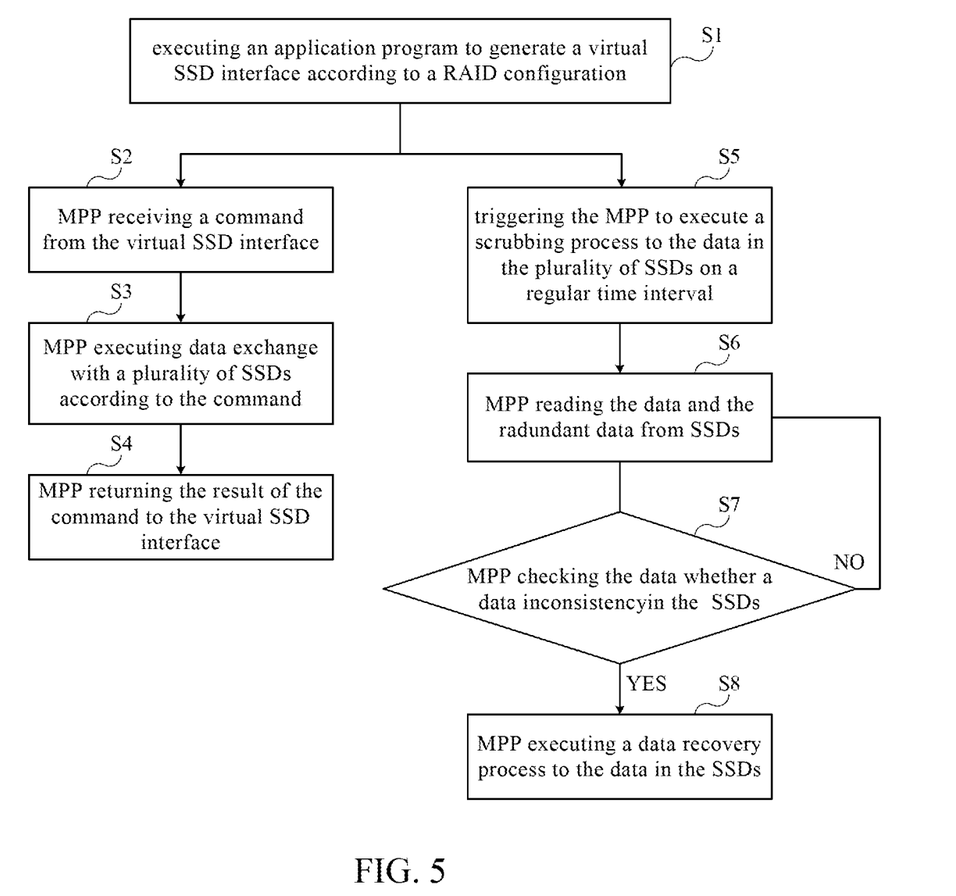
FIG. 5 is a flow diagram illustrating the data transmission and protection method in another embodiment of the present invention.

Please refer to FIG. 1 and FIG. 5. FIG. 5 is a flow diagram illustrating the data transmission and protection method in another embodiment of the present invention. The method can be achieved by the data transmission and protection system 1 in FIG. 1. In step S5, the application program triggers the MPP 13 to execute a scrubbing process to confirm the data integrity in the SSDs 15 at regular time intervals. In practice, the recurring schedule can be specified in the RAID configuration stored on the storage medium 11 and can be applied to the application program. The regular time intervals can be pre-set in the system and can be a specific time such as one hour, two hours, half day or one day; it is not limited thereto. In the step S6 and S7, the MPP 13 reads the original and the redundant data pieces on the SSDs and checks for the integrity based on the configured RAID level. For instance, the MPP 13 compares the mirrored pieces of data for RAID 1 configuration. For RAID 5 or 6, the MPP 13 re-calculates the data parities and verifies the parities with the stored ones. In the Step S8, if data inconsistency is detected, the MPP 13 recovers the data automatically. It should be noted that all data reading and writing are occurring between the MPP 13 and SSDs 15 only. The CPU 12 is not involved.

Figure 6:
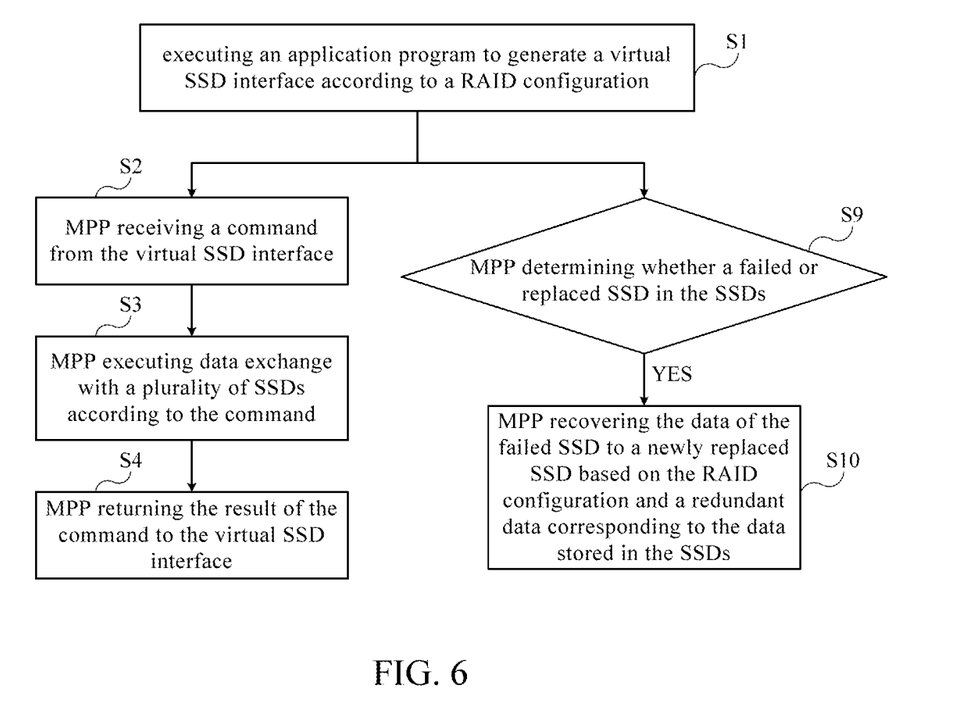
FIG. 6 is a flow diagram illustrating the data transmission and protection method in another embodiment of the present invention.

Please refer to FIG. 1 and FIG. 6. FIG. 6 is a flow diagram illustrating the data transmission and protection method in another embodiment of the present invention. The method can be achieved by the data transmission and protection system 1 in FIG. 1. In step S9, the MPP 11 determines whether any of the plurality of SSDs 15 has failed. In practice, when the MPP 11 cannot write the data into the SSD 15 or read the data from the SSD 15, the MPP 11 determines that the SSD 15 has failed. Furthermore, in the step S10, if the MPP 11 determines that the SSD 15 has failed, the MPP 11 recovers the data of the failed SSD 15 to a newly replaced SSD based on the redundant data corresponding to the data stored in the SSDs. In practice, the MPP 13 calculates the data to generate the redundant data corresponding to the data, and stores the data and the redundant data to corresponding SSDs 15. When the MPP 11 determines that one of the SSDs 15 has failed, the MPP 13 reads the data pieces and the redundant data on the working SSDs to recover the missing data piece, and then the MPP 13 stores the recovered data to the newly replaced SSD 15.

Figure 7:
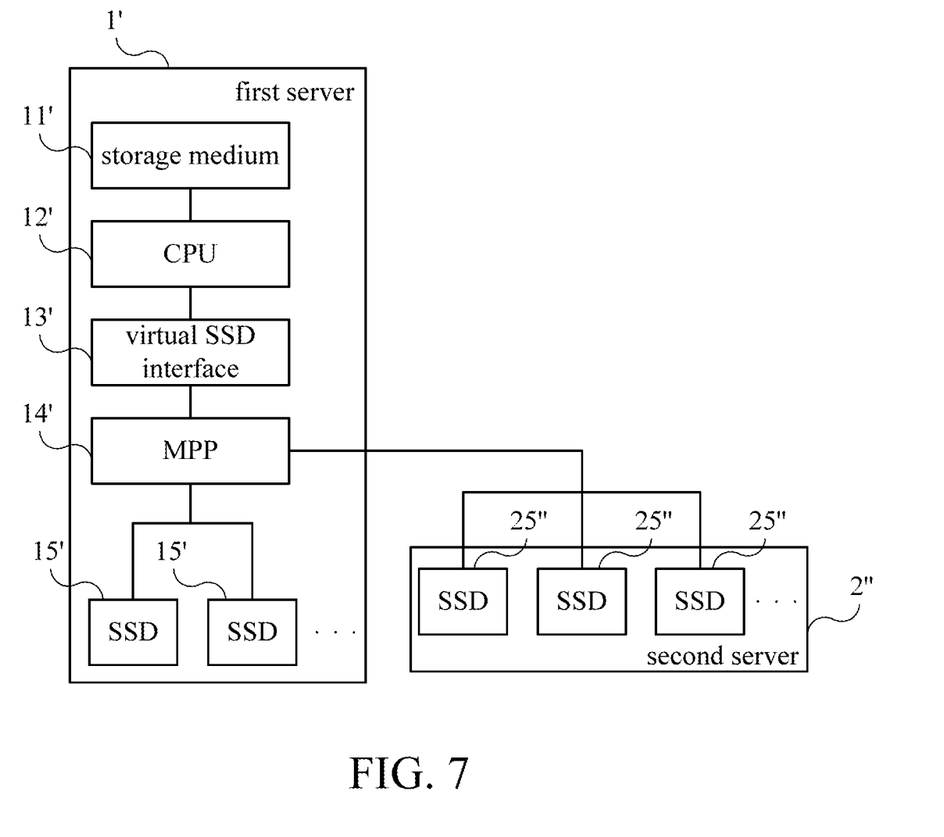
FIG. 7 is a functional block schematic diagram illustrating the data transmission and protection system in another embodiment of the present invention.
Figure 8:
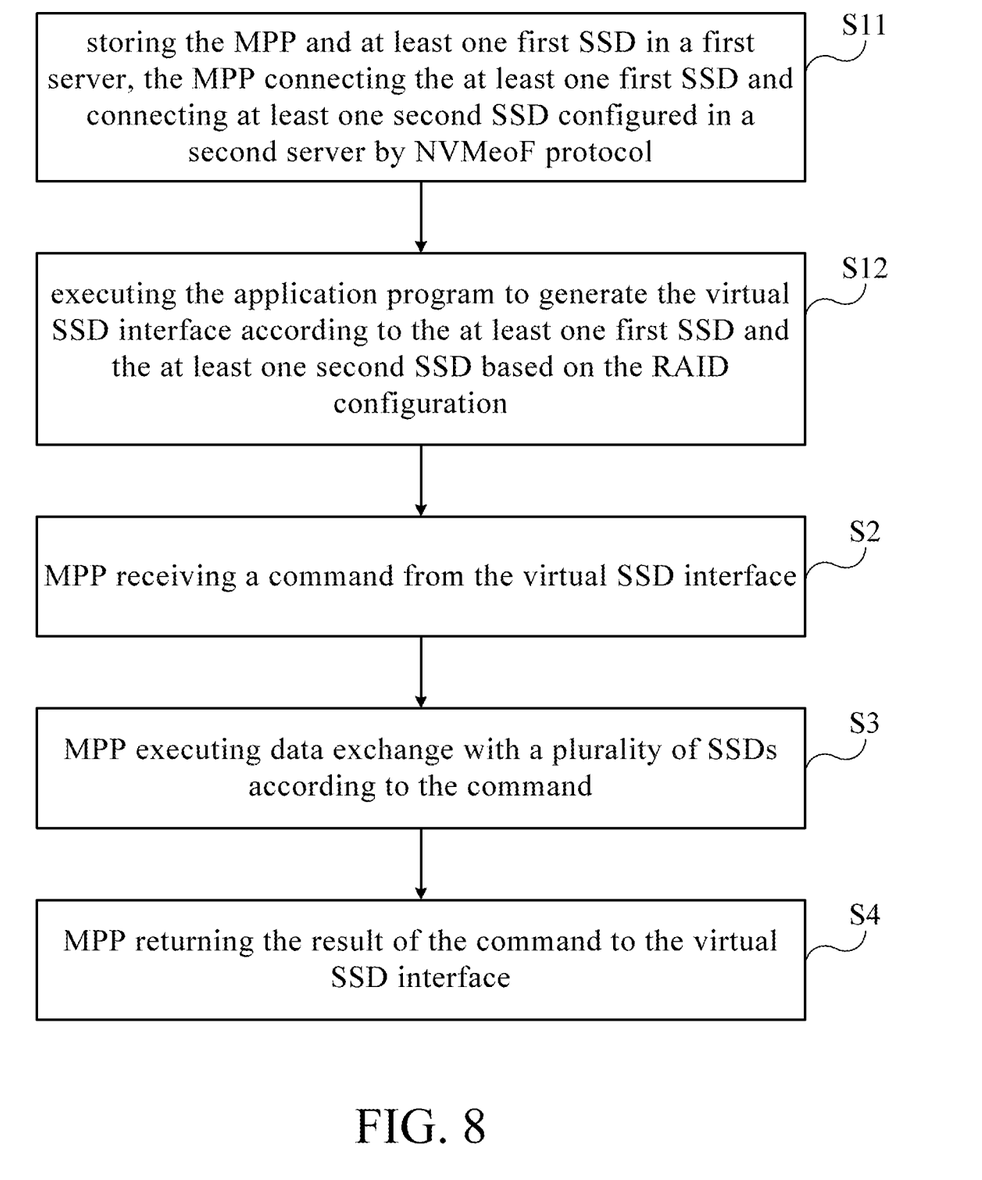
FIG. 8 is a flow diagram illustrating the data transmission and protection method in another embodiment of the present invention.

The type of the data transmission and protection system not only can be that of the aforementioned embodiment, but also can be another type. Please refer to FIG. 7 and FIG. 8. FIG. 7 is a functional block schematic diagram illustrating the data transmission and protection system 1' in another embodiment of the present invention. FIG. 8 is a flow diagram illustrating the data transmission and protection method in another embodiment of the present invention. The method in FIG. 8 can be achieved by the data transmission and protection system 1' in FIG. 7. The difference between this embodiment and the aforementioned embodiment is that the storage medium 11', the CPU 12', the MPP 13', the virtual SSD interface 14' and the SSDs 15' can be located in the first server 1' while the SSDs 25" can be located in the remote servers. In this embodiment, the SSDs 25" are located in the second server 2". The first server 1' and the second server 2"

are coupled via a high-speed storage networking fabric, such as NVMe over Fabric (NVMeoF) protocol (in step S11). That is to say, the first server 1' can connect to the SSD 15' and connect to the SSD 25" in the second server 2" via NVMeoF protocol. Therefore, the CPU 12' can generate the virtual interface 14' according to the SSD 15' and the SSD 25" (in step S12). An example of such a high-speed storage networking fabric is Infiniband, FiberChannel or converged Ethernet using RDMA technology. With RDMA technology, the MPP 13' can execute data exchange with the SSDs 15' and the SSDs 25" similarly to the peer-to-peer DMA as mentioned in the aforementioned embodiment. It is noticed that the functions of the other components are the same as those of the aforementioned embodiments; it will be not described hereto. In addition, the number of the severs is not limited to one or two, the first server can connect to a plurality of remote servers, and the MPP can exchange data with the SSDs located in the remote servers respectively. Moreover, the SSDs can be located on the same server that the MPP installed or on the remote server with or without the MPP installed. The SSDs on the remote servers in the aspect of the MPP are coupled to the local MPP via NVMeoF protocol. Furthermore, the virtual SSD interface of the SSDs can be located on a single server or multiple servers.

In summary, the data transmission and protection system of the present invention leverages the MPP to process the I/O commands received from the virtual SSD interfaces and to exchange the data with the SSDs. Moreover, the MPP can control the plurality of SSDs by peer-to-peer DMA directly to exchange the data instead of the CPU. By nature, the MPP is able to process the I/O commands parallelly and efficiently. Furthermore, the MPP can execute the data protecting processes to check the data integrity and execute the data recovery processes to recover the error data or broken SSD. Hence, the present invention can achieve extremely high performance without consuming the CPU resources, saving the precious computing resource for other applications running on the server.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

What is claimed is:
1. A data transmission and protection system, comprising:
a plurality of solid-state drives (SSDs);
a storage medium storing an application program and a redundant array of independent disks (RAID) configuration;
a central processing unit (CPU) coupled to the storage medium and configured to execute the application program to generate a virtual SSD interface for the plurality of SSDs according to the RAID configuration; and
a massively parallel processor (MPP) coupled to the virtual SSD interface and the plurality of SSDs, the MPP being configured to:
receive a command from the virtual SSD interface; and
in response to the command, execute data exchange with the plurality of SSDs based at least in part on the RAID configuration of the virtual SSD interface, wherein the data exchange does not go through the CPU, wherein the data exchange comprises direct memory access (DMA) by the plurality of SSDs.

2. The data transmission and protection system of claim 1, wherein the MPP is a graphics processing unit (GPU).

3. The data transmission and protection system of claim 1, wherein the plurality of SSDs are non-volatile memory express (NVMe) SSDs.

4. The data transmission and protection system of claim 1, wherein the command comprises a data writing command from the virtual SSD interface, and wherein the MPP is configured to generate a redundant data corresponding to a data to be written based on the RAID configuration according to the data writing command.

5. The data transmission and protection system of claim 4, wherein the MPP is configured to store the data to be written and the redundant data to the plurality of SSDs by DMA.

6. The data transmission and protection system of claim 1, wherein the command comprises a data reading command from the virtual SSD interface, and wherein the MPP is configured to read a data to be read from the plurality of SSDs by DMA according to the data reading command.

7. The data transmission and protection system of claim 6, wherein the data to be read is stored in the plurality of SSDs as a plurality of data pieces, the MPP is configured to combine the data pieces to form the data to be read.

8. The data transmission and protection system of claim 1, wherein the MPP is configured to execute a scrubbing process to check for data integrity in the plurality of SSDs at a regular time interval.

9. The data transmission and protection system of claim 8, wherein the MPP is configured to execute a data recovery process when a data inconsistency in the plurality of SSDs occurs.

10. The data transmission and protection system of claim 1, wherein the plurality of SSDs comprises a data and a redundant data corresponding to the data, the MPP is configured to recover data of a failed SSD in the plurality of SSDs to a replaced SSD according to the redundant data.

11. The data transmission and protection system of claim 1, wherein the MPP and at least one first SSD are configured in a first server and at least one second SSD configured in a second server, the at least one second SSD configured in the second server are coupled to the MPP through an NVMe over Fabrics (NVMeoF) protocol.

12. A data transmission and protection method, comprising:
executing, by a CPU, an application program to generate a virtual SSD interface for a plurality of SSDs according to a RAID configuration;
an MPP receiving a command from the virtual SSD interface; and
in response to the command, the MPP executing data exchange with the plurality of SSDs based at least in part on the RAID configuration of the virtual SSD interface, wherein the data exchange does not go through the CPU, wherein the data exchange comprises DMA by the plurality of SSDs.

13. The method of claim 12, wherein the MPP receiving the command from the virtual SSD interface comprises:
the MPP receiving a data writing command.

14. The method of claim 13, wherein the MPP executing the data exchange with the plurality of SSDs according to the command further comprises:
the MPP determining places for writing a data to be written and a redundant data corresponding to the data to be written in the SSDs;

the MPP generating the redundant data based on the RAID configuration; and the MPP controlling the SSDs by DMA to directly write the data to be written and the redundant data to the SSDs.

15. The method of claim 12, wherein the MPP receiving the command from the virtual SSD interface comprises:

the MPP receiving a data reading command.

16. The method of claim 15, wherein the MPP executing the data exchange with the plurality of SSDs further comprising:

the MPP determining places for reading data pieces of a data to be read and a redundant data corresponding to the data to be read in the SSDs;

the MPP controlling the SSDs by DMA to directly read the data pieces of the data to be read and the redundant data from the SSDs; and the MPP combining the data pieces to form the data to be read based on the RAID configuration.

17. The method of claim 12, further comprising:

the MPP executing a scrubbing process to confirm data integrity in the plurality of SSDs at a regular time interval.

18. The method of claim 17, further comprising:

the MPP checking whether there is a data inconsistency in the plurality of SSDs; and if yes, the MPP executing a data recovery process to data in the plurality of SSDs.

19. The method of claim 12, further comprising:

the MPP determining a failed SSD in the plurality of SSDs; and in response to the determination of the failed SSD, the MPP recovering data on the failed SSD to a newly replaced SSD based on the RAID configuration and a redundant data corresponding to data stored in the plurality of SSDs.

20. The method of claim 12, wherein the executing the application program to generate the virtual SSD interface according to the RAID configuration further comprises:

storing the MPP and at least one first SSD in a first server, the MPP connecting the at least one first SSD and connecting at least one second SSD configured in a second server by an NVMe over fabrics (NVMeoF) protocol; and executing the application program to generate the virtual SSD interface according to the at least one first SSD and the at least one second SSD based on the RAID configuration.

* * * * *

UNITED STATES PATENT AND TRADEMARK OFFICE
CERTIFICATE OF CORRECTION

PATENT NO. : 11,561,871 B2
APPLICATION NO. : 16/989445
DATED : January 24, 2023
INVENTOR(S) : Tsung-Lin Yu, Cheng-Yue Chang and Guo-Fu Tseng It is certified that error appears in the above-identified patent and that said Letters Patent is hereby corrected as shown below:

On the Title Page

Item (72), inventor 2, address, before "(TW)", delete "New Taipei" and insert --New Taipei City--, therefor.
Item (72), inventor 3, address, before "(TW)", delete "New Taipei" and insert --New Taipei City--, therefor.

In the Specification

In Column 1, Line(s) 39, delete "110~150" and insert --100~150--, therefor.
In Column 5, Line(s) 16, delete "SSD 1513" and insert --SSD 15B--, therefor.

Signed and Sealed this
Thirteenth Day of June, 2023

Katherine Kelly Vidal
*Director of the United States Patent and Trademark Office*